(12) United States Patent
Senda

(10) Patent No.: US 6,350,984 B1
(45) Date of Patent: Feb. 26, 2002

(54) OPTICAL ENCODER

(75) Inventor: Rirou Senda, Fukuoka (JP)

(73) Assignee: Kabushiki Kaisha Yaskawa Denki, Kitakyushu (JP)

(*) Notice: Subject to any disclaimer, the term of this patent is extended or adjusted under 35 U.S.C. 154(b) by 0 days.

(21) Appl. No.: 09/701,862

(22) PCT Filed: May 24, 1999

(86) PCT No.: PCT/JP99/02701

§ 371 Date: Dec. 5, 2000

§ 102(e) Date: Dec. 5, 2000

(87) PCT Pub. No.: WO99/64826

PCT Pub. Date: Dec. 16, 1999

(30) Foreign Application Priority Data

Jun. 5, 1998 (JP) .......................................... 10-157531

(51) Int. Cl.[7] .................................................. G01D 5/34
(52) U.S. Cl. .............................. 250/231.13; 250/231.14
(58) Field of Search ........................ 250/231.1, 231.11, 250/231.13, 231.14, 231.15, 231.16, 231.17, 231.18

(56) References Cited

U.S. PATENT DOCUMENTS

| | | | | |
|---|---|---|---|---|
| 4,214,155 A | * | 7/1980 | Jones ..................... | 250/231.11 |
| 4,338,517 A | * | 7/1982 | Perrine ................... | 250/231.13 |
| 4,385,234 A | * | 5/1983 | Johnson ................... | 250/231.1 |
| 4,387,374 A | * | 6/1983 | Wiener ................... | 250/231.14 |
| 4,593,269 A | * | 6/1986 | Nakamura et al. ...... | 250/231.16 |
| 5,773,820 A | * | 6/1998 | Osajda et al. .......... | 250/231.14 |

FOREIGN PATENT DOCUMENTS

| | | |
|---|---|---|
| JP | 60-107520 | 6/1985 |
| JP | 61-122519 | 6/1986 |
| JP | 2-89313 | 7/1990 |

* cited by examiner

*Primary Examiner*—John R. Lee
(74) *Attorney, Agent, or Firm*—Armstrong, Westerman & Hattori, LLP

(57) ABSTRACT

An optical encoder that accurately performs rotation while protecting a rotating disk from dust. The optical encoder comprises a shaft (5) supported by a bearing (6) in a housing (1), a rotating disk (8) fixed to the shaft (5), a light-emitting element (10) mounted on the housing (1), a photodetector element (12) mounted on a sub-board supported by the housing (1) for receiving the light passing through or reflected by the rotating disk (8), and a main substrate (13) mounted on the housing and provided with a circuit for determining the quantity of rotation or the angular position form the light received by the photodetector element (12). The housing (1) includes a holder (9), which as an annular cover (9a) engaged with the border of the main substrate (13) and a retainer (9b) formed on the cover (9a) for holding the light-emitting element.

7 Claims, 2 Drawing Sheets

(a)

(b)

OPTICAL ENCODER

FIELD OF THE INVENTION

The present invention relates to an optical encoder for detecting the rotations of a motor, etc.

BACKGROUND OF THE INVENTION

A prior art optical encoder is constructed as shown in FIG. 2 and FIG. 3

In the drawings; housing 20 is attached to and fixed at a mount 23 of a bracket 22 of a motor 21. A rotating shaft 24 is supported at the housing 20 by means of a bearing 25 and is directly connected to the rotating shaft 26 of the motor 21 via a connector 26a. A rotary disk 27 has a pattern (not illustrated) composed of a light shielding portion or a light-penetrating portion attached to a transparent member such as glass that is attached to the rotating shaft 24. A holder 28 is a holder to retain light emitting elements, which is constructed by molding. As shown in FIG. 3, the holder 28 is constructed of a supporting portion 28a attached to the housing 20 and an attaching portion that attaches the light-emitting element 29. The light emitting element 29 is attached so as to be inserted into a hole portion secured at the supporting portion 28a of the holder 28. A sub-board 30 has a photo detector element 31 attached to the plate surface of the sub-board 30. A main board 32 is attached to the housing 20 via a supporting member (not illustrated), and the main board is connected to the sub-board 31 by a connection line (not illustrated), and an electronic component that detects the speed of rotation or position of the rotation is incorporated on the plate surface of the main board 32. A cover 33 covers up the optical encoder and is fixed at the bracket 22 of the motor 21. A lead wire 34 comes out of the optical encoder.

Next, a description is given of an assembly process of an optical encoder.

First, the rotating shaft 24 is attached to the bearing 25 attached to the housing 20, and a rotary disk 27 is fixed at the rotating shaft 24. Next, the sub-board 30 provided with the photo detector element 31 is attached to the housing 20, wherein the holder 28 to which the light emitting element 29 is attached is fixed at the housing 20 so that it is opposed to the photo detector element 31 to accommodate the rotary disk 27 therein.

The optical encoder thus constructed is completed so that the cover 33 surrounding the optical encoder is attached to the bracket 22 of the motor 21 after it is attached on the mounting seat of the bracket 22.

Actually however, since the outer circumferential portion of the rotary disk is made open until the prior art optical encoder is attached to the motor, foreign substances and dust floating in the air may adhere to the rotary disk or foreign substances and/or dust adhered to the cover may drop from the cover due to vibrations during operation and adhere to the rotary disk, thereby making rotation detection impossible.

DISCLOSURE OF THE INVENTION

It is therefore an object of the present invention to provide an optical encoder that is capable of executing accurate rotation detection, free from any adhered foreign substances and/or dust.

In order to solve the abovementioned problems, an optical encoder according to the invention comprises a rotating shaft pivotally supported on a bearing of the housing; a rotary disk fixed at the rotating shaft; a light emitting element attached to the housing; a photo detector element attached to the housing, which can receive light passed through or reflected by the rotary disk from the light emitting element; and a main board incorporating a circuit that detects the speed of rotation and position of rotation from the light received by the photo detector element and is attached to the housing; wherein a holder consisting of a covering portion annularly formed so as to be engaged with the outer circumference of the main board and a light emitting element retaining portion formed at the covering portion is attached to the housing.

Therefore, according to the invention, it is possible to secure a dust-proof structure without hindering the assembly process of an optical encoder and to accurately detect the rotation without permitting foreign substances and/or dust to adhere to the rotary disk.

BEST MODE FOR CARRYING OUT THE INVENTION

Figure 1:
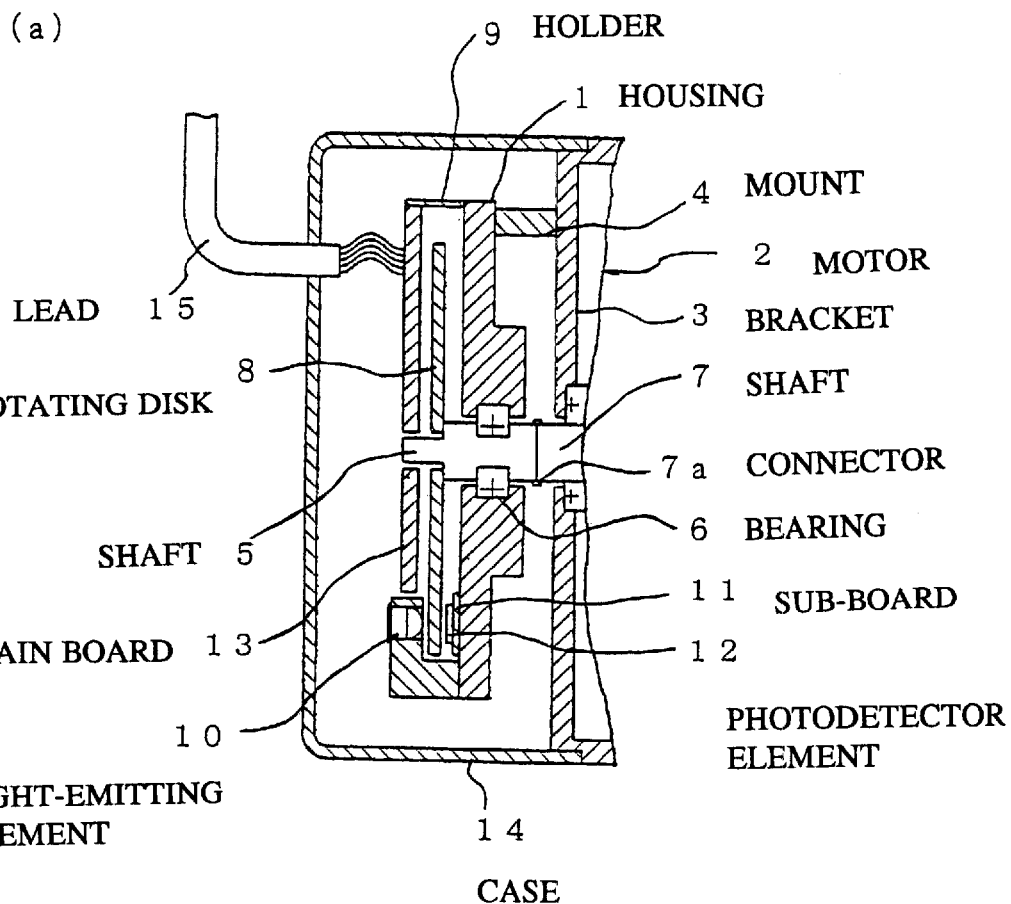
FIG. 1 shows an embodiment of the invention, wherein (a) is a side elevational view of an optical encoder, and (b) is an enlarged view of the major parts of the optical encoder.
Figure 1:
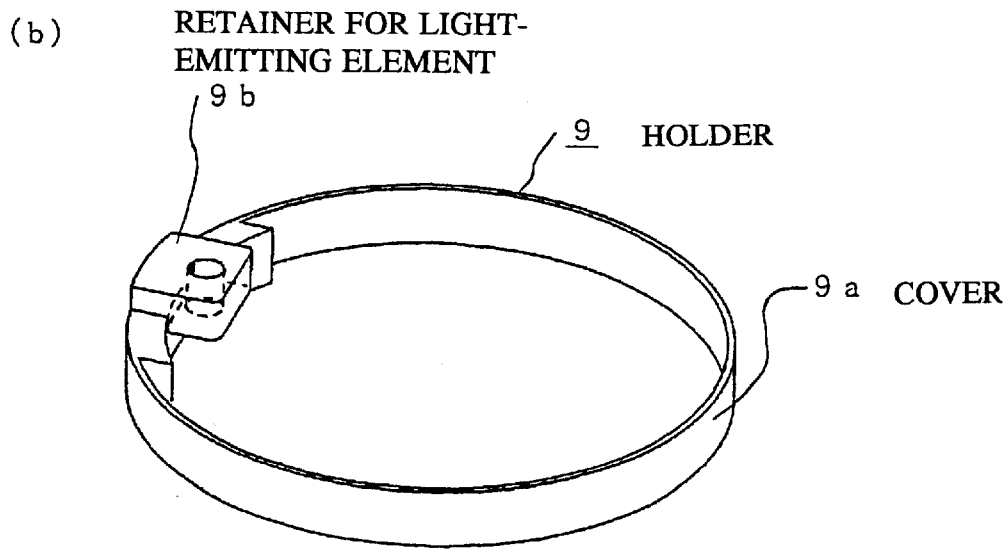
Figure 2:
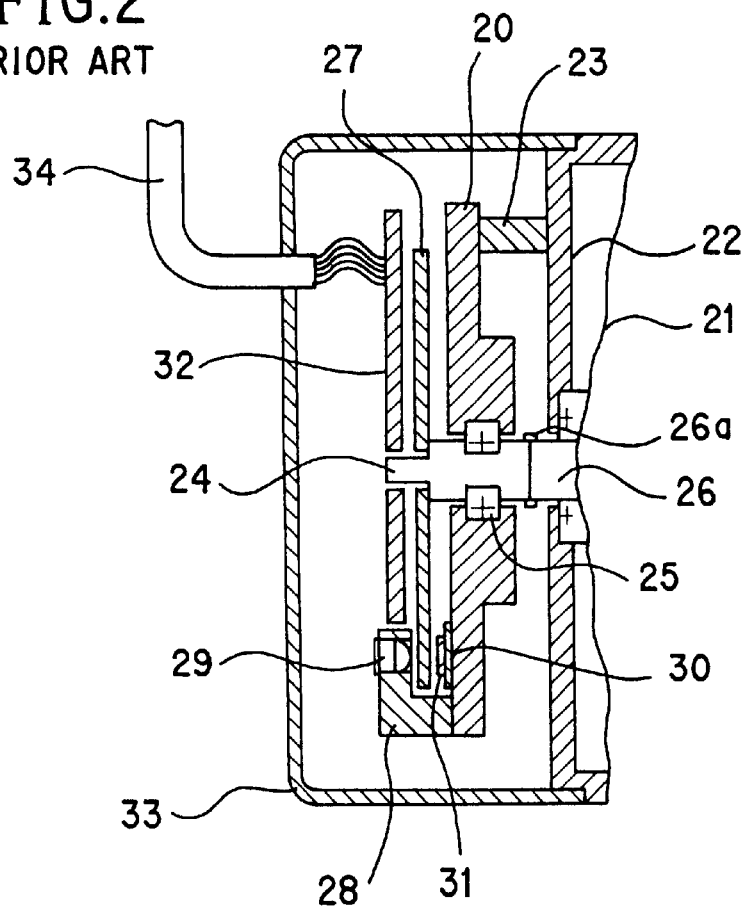
FIG. 2 is a side elevational view of a prior art optical encoder.
Figure 3:
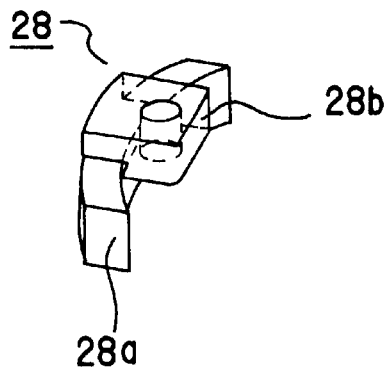
FIG. 3 is an enlarged view of the major parts of the prior art optical encoder.

Hereinafter, a description is given of an embodiment of the invention with reference to the accompanying drawings:

FIG. 1 shows. an embodiment of the invention, wherein (a) is a side elevational view of an optical encoder, and (b) is a perspective view of the holder thereof.

In the drawings, a housing 1 is attached to a mount 4 secured on a bracket 3 of a motor 2. A rotating shaft 5 is attached to the housing 1 via a bearing 6. The rotating shaft 5 and a rotating shaft 7 of the motor 2 are connected to each other by means of a connector 7a. A rotary disk 8 has a pattern (not illustrated) consisting of a light shielding portion and a light penetrating portion on a transparent member such as glass, which is attached to the rotating shaft 5. A light emitting element holder 9 is provided with a covering portion 9a annularly formed of synthetic resin as shown in FIG. 1b and a light emitting element retaining portion 9b that retains the light emitting element 10. The light emitting element 10 is attached so as to be inserted into a hole portion secured at the light emitting element retaining portion 9b. A sub-board 11 has a photo detector element 12 formed on the plate surface thereof and is attached to the housing 1. A main board 13 is attached to the housing 1 by means of a supporting member (not illustrated), wherein the main board 13 and the sub-board 13 are connected to each other via a connector (not illustrated), and an electronic component that detects the speed of rotation or position of rotation is mounted on the plate surface of the main substrate 13. A cover 14 covers up the optical encoder and is fixed on the bracket 3 of the motor 2. A lead wire 15 is provided to lead the amount of rotation and the position thereof from the optical encoder.

Next, a description is given of an assembly process of an optical encoder.

The rotating shaft 5 is attached to the bearing 6 attached to the housing 1, and the rotary disk 8 is fixed at the rotating shaft 5. And, the sub-board 11 provided with the photo detector element 12 is fixed at the housing 1. The main board 13 is fixed at the housing 1 by means of a supporting member (not illustrated). As one side of the covering portion 9a of the holder 9 is fitted to the outer circumference of the main board 13, the other side of the covering portion 9a is brought into contact with the plate surface of the housing 1. A light emitting element 10 is attached into the hole of the light emitting element retaining portion 9b of the holder 9, thereby constituting the optical encoder. The housing of the optical encoder thus constructed is fixed at the mount 4 secured at the bracket 3 of the motor 2, wherein the rotating shaft of the optical encoder is coupled to and fixed at the rotating shaft 7 of the motor 2 via a connector 7a. Thereafter, the cover 14 that surrounds the optical encoder is constructed so as to be attached to the bracket 3 of the motor 2. Therefore, since the holder 9 that retains the light emitting element 10 surrounds the outer circumference of the rotary disk 8 secured between the housing 1 and the main board 13, no foreign substances and/or dust are permitted to enter the rotary disk 8, and rotation can be accurately detected.

Industrial Applicability

Also, as described above, since one side of the covering portion 9a of the holder 9 is devised to be fitted to the outter circumferential surface of the main board 13 until the other side of the covering portion 9a is brought into contact with the plate surface of the housing 1 when attaching the holder 9, it is possible to attach the holder 9 around the final process of the final assembling of an optical encoder, and in particular the existence of the covering portion 9a of the holder 9 will not hinder the assembly process.

What is claimed is:

1. An optical encoder comprising:

a housing;

a rotating shaft pivotally supported on a bearing of the housing;

a rotary disk fixed to said rotating shaft adjacent to said housing;

a light emitting element sending light to a photo detector element via said rotary disk;

a main board mounted adjacent to said housing, said main board including a circuit that detects an amount of rotations and a position of rotation of the rotary disk from the light received by said photo detector element; and a holder attached to said housing and further comprising a covering portion annularly formed so as to be engaged with an outer circumferential surface or edge of said main board and a light emitting element retaining portion formed at the covering portion.

2. The optical encoder of claim 1, wherein the covering portion comprises an annular band.

3. The optical encoder of claim 2, wherein the annular band is open.

4. The optical encoder of claim 2, wherein: a housing surface of the housing is disposed generally parallel to the main board; the annular band substantially encloses a space between the housing surface and the main board; and the space contains the rotary disk.

5. The optical encoder of claim 1, wherein the holder is unitary and the covering portion and the light emitting element retaining portion comprise respective portions of the unitary holder.

6. The optical encoder of claim 5, wherein the holder is formed of synthetic resin.

7. The optical encoder of claim 1, wherein the engagement of the covering portion with the outer circumferential surface of said main board includes direct contact.

* * * * *